United States Patent [19]

Ohshita

[11] Patent Number: 5,612,826
[45] Date of Patent: Mar. 18, 1997

[54] LENS HOLDING DEVICE FOR HOLDING A LENS SYSTEM AND METHOD FOR MAKING

[75] Inventor: Koichi Ohshita, Tokyo, Japan

[73] Assignee: Nikon Corporation, Tokyo, Japan

[21] Appl. No.: 496,665

[22] Filed: Jun. 29, 1995

[30] Foreign Application Priority Data

Jul. 25, 1994 [JP] Japan .................................. 6-192791

[51] Int. Cl.⁶ .................................................. G02B 7/02
[52] U.S. Cl. ......................... 359/819; 359/811; 359/820
[58] Field of Search .................................. 539/818, 820, 539/811, 812, 822, 823

[56] References Cited

U.S. PATENT DOCUMENTS 2,954,461  9/1960  Tucker ..................................... 359/811
3,784,287  1/1974  Grey ......................................... 359/819
4,662,717  5/1987  Yamada et al. ......................... 359/811
4,787,724  11/1988 Kudo et al. .

FOREIGN PATENT DOCUMENTS 5-34591   2/1993  Japan .
0680532   2/1964  United Kingdom ................... 359/820
1017775   1/1966  United Kingdom ................... 359/820

Primary Examiner—Loha Ben
Attorney, Agent, or Firm—Oliff & Berridge

[57] ABSTRACT

A lens holding device and a lens system equipped with the holding device are simple in structure and low in cost. The lens holding device includes a cylindrical lens barrel that is structured as one body with a single plastic lens and has an inside diameter larger than the effective diameter of the plastic lens. A holding ring, made from an impermeable substance, holds at least one lens that has been inserted into the lens barrel and fixes the position of the lens. The holding ring covers the edge surface of the lens barrel.

25 Claims, 7 Drawing Sheets

LENS HOLDING DEVICE FOR HOLDING A LENS SYSTEM AND METHOD FOR MAKING

BACKGROUND OF THE INVENTION

1. Field of the Invention

The present invention relates to a lens holding device and to a lens system that is equipped with the device. Specifically, the present invention relates to a lightweight, low-cost lens holding device and to a triplet lens system that employs the device, both of which are utilized on a portion of an optical system.

2. Background of the Related Art

In recent years, the number of optical systems that employ a plastic material in part of the lens system has increased. Along with this increase, several lens holding components have been proposed that make use of the advantageous characteristics of plastic. In particular, triplet lenses that employ one glass lens and two plastic lenses have come into wide use as lenses for inexpensive compact cameras.

An example of a holding device for this type of triplet lens optical system is a device introduced in Japanese Laid Open Patent Application Sho 63-141011.

With this conventional lens holding device, the diaphragm is positioned in between the second lens, which is a plastic lens, and the third lens, which is also a plastic lens. The diaphragm is in contact with both lenses. The second lens and the first lens are each inserted into the lens barrel as separate components and are fixed in place by a retaining ring.

The above-mentioned lens holding device is structurally simpler than earlier lens holding devices. However, it is structurally complicated to insert the plastic lenses holding the diaphragm into the lens barrel, and sufficient cost reduction is not achieved.

On a conventional optical system, in order to effectively shelter the lens system from light rays that cause "ghosts" or flares, it is common to position at least two light ray protecting devices in the vicinity of the incident surface and in the vicinity of the exit surface.

As shown by the example in the above-mentioned Japanese Laid Open Patent Application Sho 63-141011, a thin plate with an aperture can be inserted between lens L2 and lens L3 in the position shown by reference numeral 105 as the second light ray protecting device that is to be positioned in the vicinity of the exit surface, forming a fixed diaphragm.

However, with the method in which this type of fixed diaphragm formed from a thin plate is inserted between lens L2 and lens L3, the lens L2 can easily become eccentric with slight curvings or bendings of the thin plate. Thus, there is a danger of reducing the optical efficiency.

In addition, from the standpoint of optics, the second light ray protecting device should be as close as possible to the exit surface. Therefore, it is not desirable to have a structure such that a fixed diaphragm formed from a thin plate is inserted between lens L2 and lens L3.

A structure is also conceivable in which a fixed diaphragm is bonded in the position of the light ray exit surface 109. However, in this structure, the process of bonding the fixed diaphragm must be added. The addition of this process drastically reduces the manufacturing efficiency. Furthermore, an increase in the thickness of the lens barrel 4 with respect to the effective diameter of the lens L3 to ensure a sufficient bonding area cannot be avoided.

On a conventional triplet lens, the third lens L3 is commonly formed by a methacryl resin. This choice of material has two disadvantages.

The first disadvantage is that there are large variations in shape due to changes in humidity, and the optical efficiency does not remain constant throughout environmental changes. Another disadvantage is that, since the dispersion of the third lens L3 is a low dispersion when compared with the glass material used in the first lens L1, the off-axis chromatic aberrations become over-corrected when compared with the axial chromatic aberrations on the axis, resulting in a reduction in the off-axis optical efficiency.

SUMMARY OF THE INVENTION

The present invention has been conceived in light of the problems stated above, and has an object of providing a lens holding device and a lens system equipped with the device that are structurally simple and low in cost.

In order to resolve the problems mentioned above, the present invention provides a lens holding device including a cylindrical lens barrel that is structured as one body with a single plastic lens and has an inside diameter larger than the effective diameter of the plastic lens. The holding system further includes a holding ring, made from an impermeable substance, which holds at least one lens that has been inserted into the lens barrel and fixes the position of the lens. The holding ring covers the edge surface of the lens barrel.

According to another aspect of the present invention, a lens system is provided that consists of the lens holding device described above, at least one glass lens that is inserted into the lens barrel, and at least one plastic lens that has a refractive power with a sign opposite that of the plastic lens that is formed as one body with the lens barrel. When the focal length of the plastic lens that is formed as one body with the lens barrel is taken as fa and the focal length of the plastic lens that is inserted into the lens barrel is taken as fb, then $-2.0 < fa/fb < -0.5$.

According to another aspect of the present invention, a triplet lens system is provided that consists of the lens holding device mentioned above, a glass lens that is the closest lens to the object side and is inserted into the lens barrel, and a first plastic lens that has a refractive power with a sign opposite that of a second plastic lens, which is formed as one body with the lens barrel, and is fixed in position between the glass lens and the second plastic lens. The glass lens is a positive meniscus lens with a convex surface on the object side. The first plastic lens is a biconcave lens having a concave surface with the stronger curvature on the image side and is formed from polycarbonate, polystyrene, or a copolymer of polystyrene and methacryl. The second plastic lens is a biconvex lens having a convex surface with the stronger curvature on the object side and is formed from a copolymer of polystyrene and methacryl.

BRIEF DESCRIPTION OF THE DRAWINGS

The invention will be described in detail with reference to the following drawings in which like reference numerals refer to like elements and wherein.

DETAILED DESCRIPTION OF PREFERRED EMBODIMENTS

Each embodiment of the present invention is described below with reference to the drawings.

Figure 1:
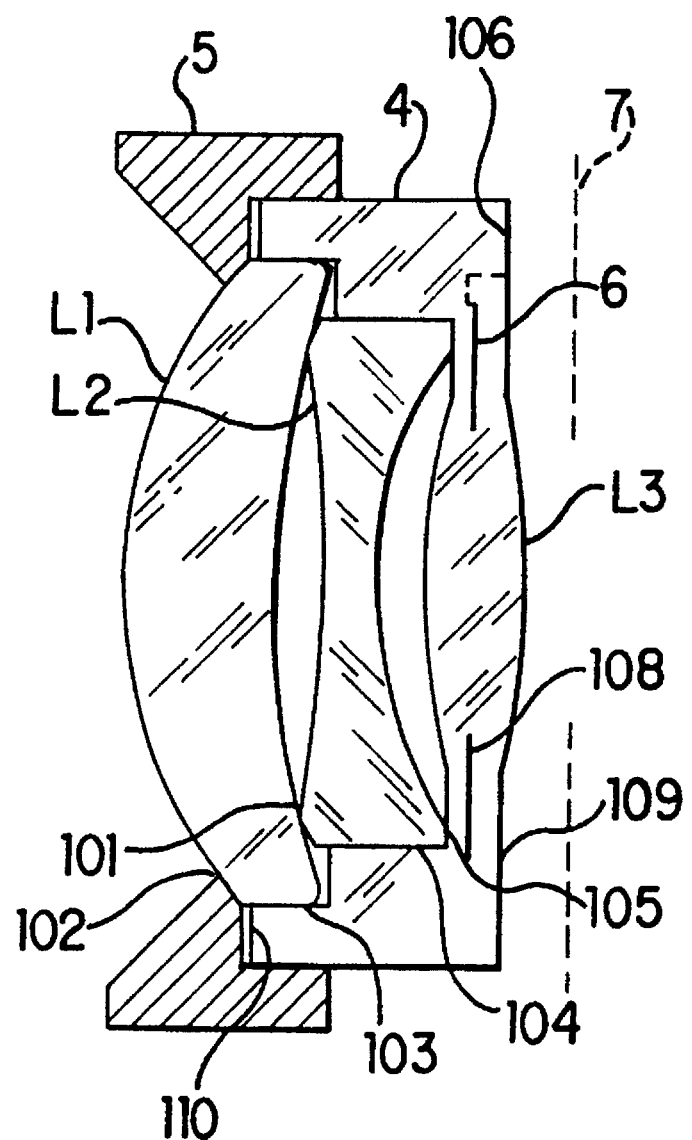
FIG. 1 shows the structure of a triplet lens that pertains to the first embodiment of the present invention.

FIG. 1 is a cross sectional drawing that roughly shows the structure of the lens holding device of the present invention and of a lens system equipped with the device.

With the device and lens system shown, the plastic lens L3 and the lens barrel 4 are formed as a single body. Lens L1 and lens L2 are assembled inside the lens barrel 4. Lens L1 is positioned and held in a position perpendicular to the optical axis in such a manner that the outer edge surface of lens L1 is in contact with the inner wall surface 103 of the lens barrel 4. The convex surface on the object side of lens L1 (the left side of the drawing) is in contact with the inside surface of the holding ring 5, and lens L1 is thus positioned and held in the direction of the optical axis. Lens L2 is held in a position perpendicular to the optical axis in such a manner that the outside edge surface of lens L2 is in contact with the inner wall surface 104 of the lens barrel 4. The concave surfaces are in contact with lens L1 and lens L3, respectively, and lens L2 is thus positioned and held in the direction of the optical axis.

An advantage of this lens holding device is that a lens barrel is not needed as a separate component from the lenses. Furthermore, since back-lash of the lens L3 inside of the lens barrel 4 disappears because the lens L3 is formed as a single body with the lens barrel 4, the precision with which the lens is centered and is held against movement in the direction perpendicular to the optical axis is extremely advantageous.

In the structure described above, the lens barrel 4, which is formed as one body with the lens L3, must be transparent. As a result, light that passes the lens barrel 4 becomes harmful "ghost light," reducing the optical efficiency of the triplet lens system shown.

Therefore, with the present invention, the end surface of the transparent lens barrel 4 is covered by an impermeable holding ring 5. When the light rays proceed from left to right in the drawing, the incidence of light rays is restricted by the aperture 102 of the holding ring 5. Thus the light that passes the lens barrel 4 can be reliably prevented from becoming harmful "ghost light."

With the present invention, it is desirable to have one more light ray protecting means in the vicinity of the exit surface in addition to the aperture 102 of the holding ring 5 that is positioned in the vicinity of the incident surface. Therefore, with the present invention, a thin plate 6 that forms the fixed diaphragm is enclosed inside the lens L3. Thus, when light rays exit toward the right of the drawing, the exiting light rays can be restricted in the vicinity of the exit surface 109 via the fixed diaphragm that is formed by the thin plate 6.

When a fixed diaphragm is enclosed in the lens L3 in advance, there is no need to insert or bond a separate diaphragm as with conventional methods. Thus, the assembly of each optical element can be carried out efficiently, and light rays that are optically harmful can be effectively restricted.

An example of the method of precisely enclosing the thin plate 6 in the lens L3 is described below.

Figure 3:
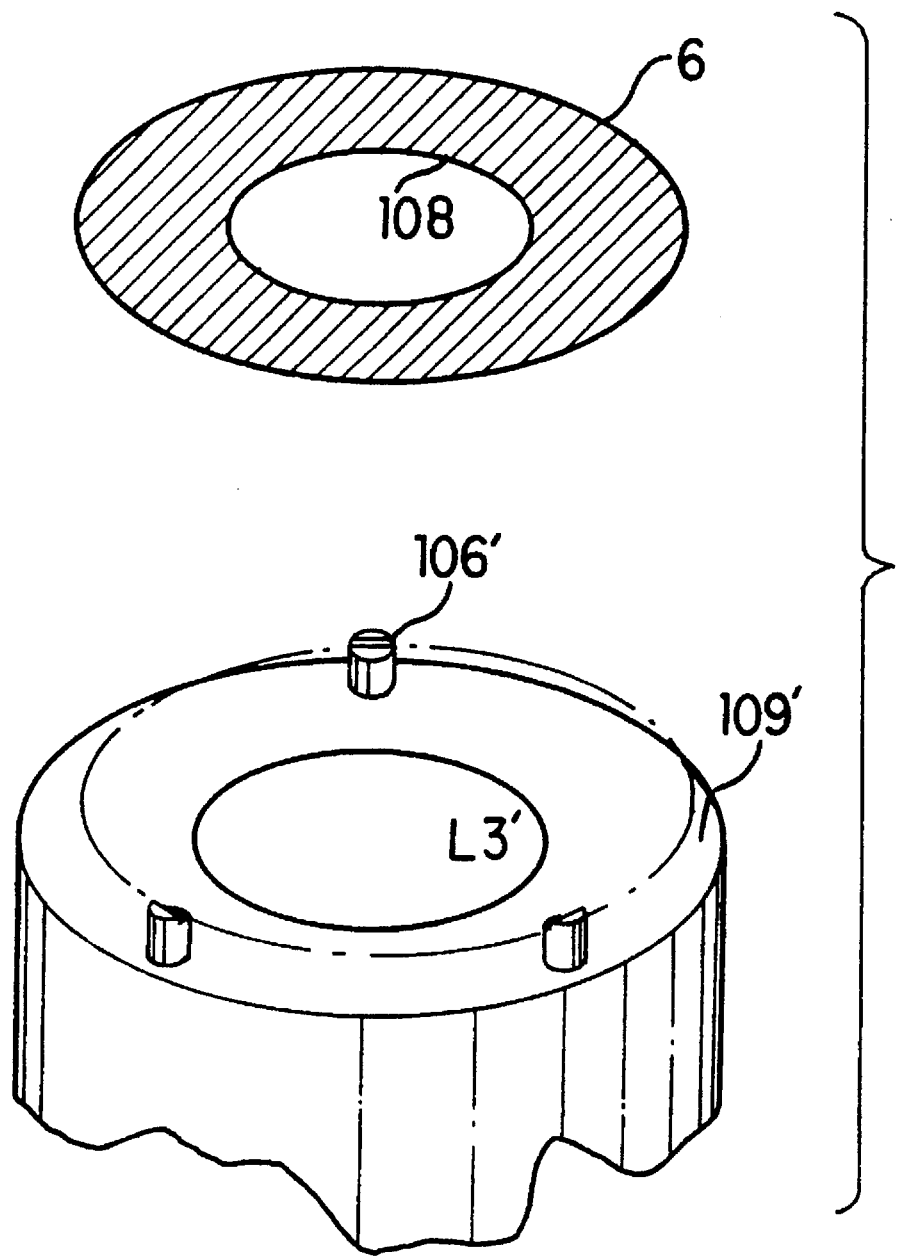
FIG. 3 shows the structure of the metal mold, which is part of a set of metal molds used to make the lens barrel and lens of FIG. 1 by injection molding for the exit surface side of the lens.
Figure 4A:
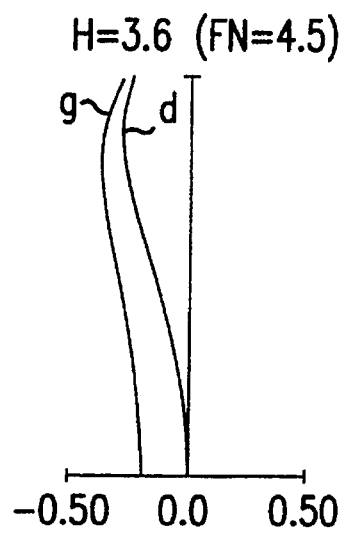
FIG. 4 shows various aberration diagrams for embodiment 1.
Figure 4B:
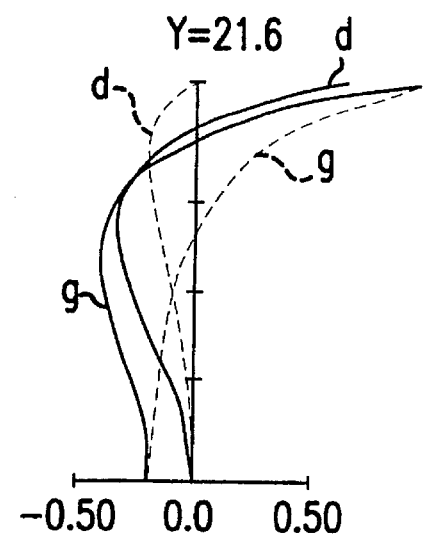
Figure 4C:
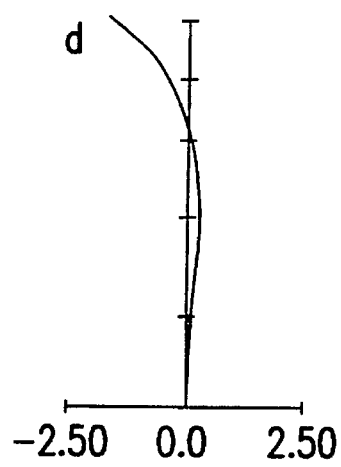
Figure 4D:
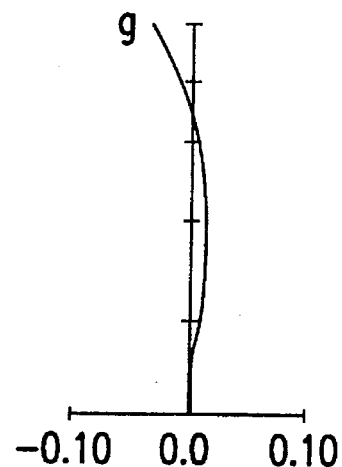
Figure 4E:
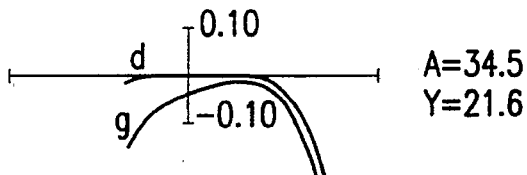
Figure 4F:
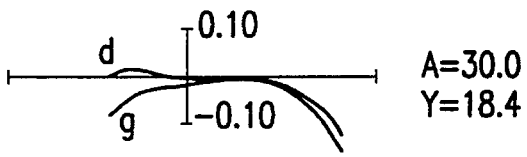
Figure 4G:
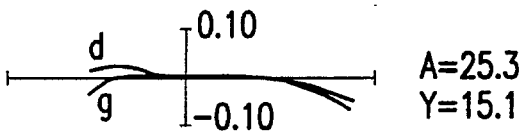
Figure 4H:
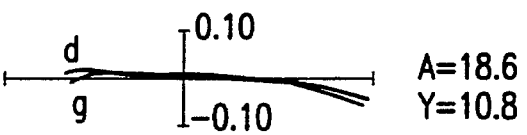
Figure 4I:
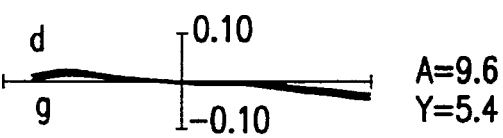
Figure 4J:
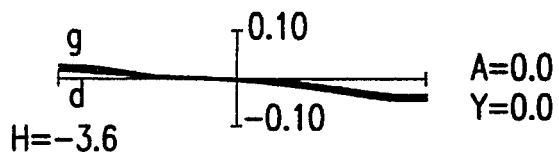
Figure 5A:
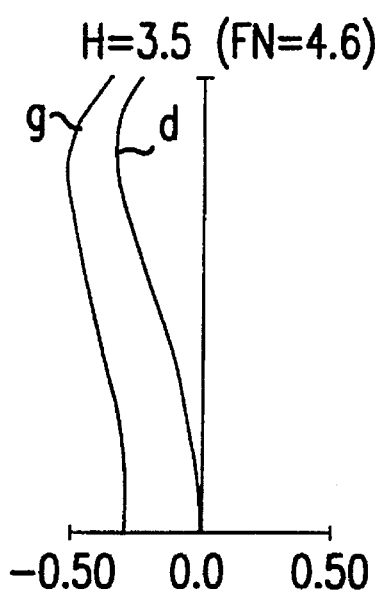
FIG. 5 shows various aberration diagrams for embodiment 2.
Figure 5B:
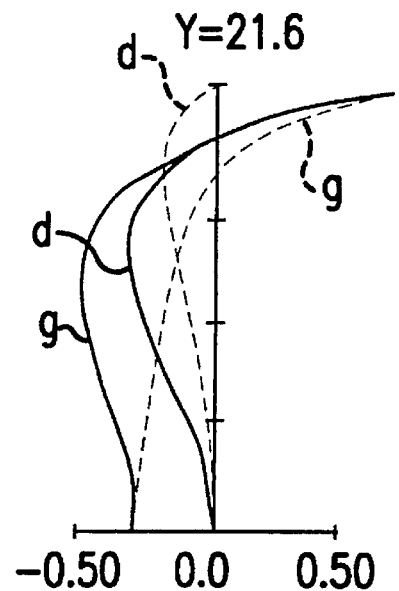
Figure 5C:
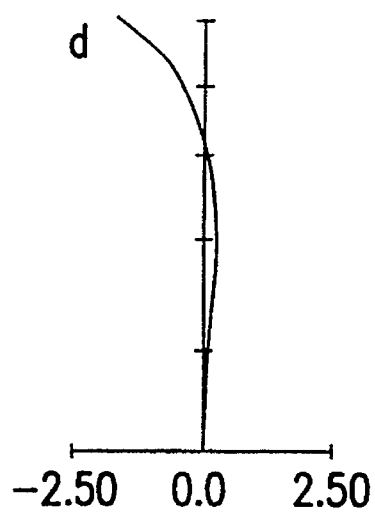
Figure 5D:
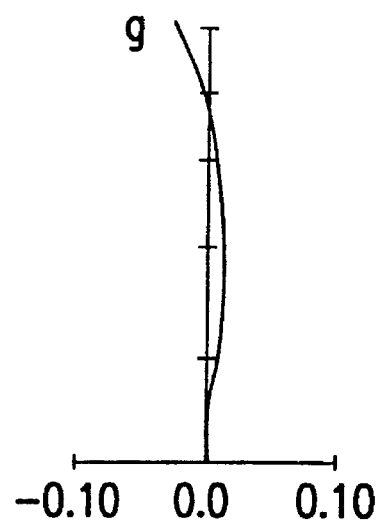
Figure 5E:
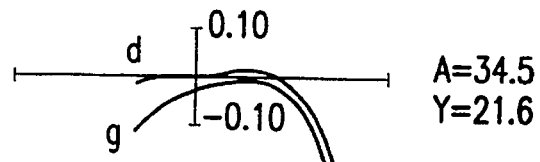
Figure 5F:
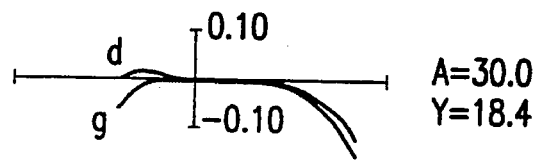
Figure 5G:
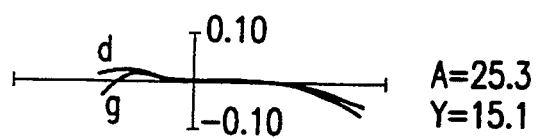
Figure 5H:
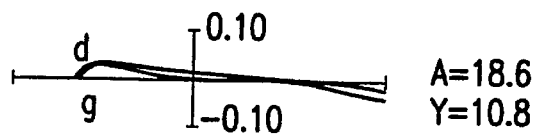
Figure 5I:
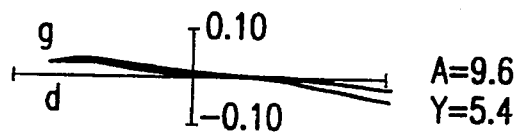
Figure 5J:
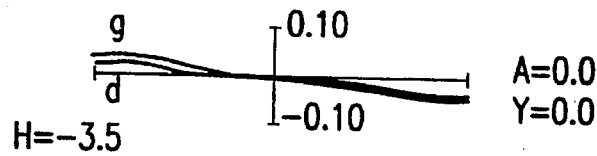

FIG. 3 shows a metal mold for the exit surface side of the lens L3. This metal mold is one of a set of metal molds that are used in the formation of the lens L3 and the lens barrel 4 through injection molding. As shown in FIG. 3, the lens surface on the exit side of the lens L3 is formed by the central region L3' of the metal mold, and the outside edge 109 of the lens L3 is formed by the outer region 109' of the metal mold.

Three guide posts 106' are formed on the outer region 109' of the metal mold. As an example, these guide posts are positioned at points obtained when the outer region is divided into three equal parts. Notches are formed on each guide post facing the center of the mold. The disk 6 that is formed from a thin donut-shaped plate and comprises the fixed diaphragm can be held in position by these notches.

During the actual injection molding, when the metal mold on the lens barrel formation side (not shown) and the metal mold shown have been opened, the disk 6, which has an aperture 108, is placed in the notches of the guide posts 106' and held in place. After the above-mentioned set of metal molds has been stuck together, a resin is poured into the space formed by the set of metal molds.

Thus, since the disk 6 is enclosed in the resin, it is necessary for the Tg point of the material of the disk 6 to be higher than that of the plastic material that formed the lens barrel 4 and the lens L3. Therefore it is desirable for the disk 6 to be made from some metallic material of relatively high rigidity and relatively low unit price, such as steel, aluminum, brass, copper, nickel, or any combination thereof. Glass fibers or a carbon textile, for example, could be used as acceptable nonmetallic substitutes for the material of the disk 6.

It is common to use injection molding when a lens tube and a lens are to be formed as one body, as with the present invention. In this case, during the fabrication by injection molding, there is the so-called problem of "draft." Namely, in order to facilitate the removal of the metal mold after injection molding, the inside wall surfaces 103 and 104 of the lens barrel 4 are not perfectly cylindrical surfaces that are in parallel with the optical axis, but are sloped surfaces such that the inside diameter gradually increases in the direction of edge 110.

When a lens is inserted into the lens barrel 4 that has, at the extreme, a bell-shaped inner wall, back-lash of the inserted lens in the direction perpendicular to the optical axis cannot be avoided. As a result, the optical efficiency decreases due to eccentricity of the lens.

It is conceivable that a processing method could be adopted such that there is virtually no draft. However, in this case, the movable portion of the metal mold increases, making it difficult to maintain a stable processing precision and resulting in an increased cost of production.

Therefore, with the present invention, the so-called draft on the inner wall surface of the lens barrel is presupposed. By making the outside edge surface of the lens, which is to be inserted into the lens barrel and which has a draft on the inner wall surface, into a bevelled shape that contacts the inner wall surface of the lens barrel, it is possible to maintain a lens with high accuracy.

Even on a glass lens, the processing of the outside edge surface of the lens is comparatively simple. Furthermore, when the lens that is to be inserted is formed from plastic, as is the lens barrel, a draft generally exists on the outside edge surface of the lens. Therefore, by making the bevelling angle and direction of the draft of the outside edge surface of the lens to coincide with the bevelling angle and direction of the draft of the inner wall surface of the lens barrel, it is possible to maintain a lens with a high accuracy.

Alterations of the shape of the plastic through environmental changes may also occur. In particular, since the change in shape of plastic accompanying humidity changes is a hysteresis characteristic, back-lash occurs between the lens barrel and the inserted lenses. This can easily lead to a decline in optical efficiency.

Therefore, with the present invention, it is desirable for the lens barrel 4 and the lens L3 to be made of a substance that has a relatively small change in shape due to humidity changes, such as polycarbonate, polystylene, a copolymer of polystylene and methacryl, or a polyolefin resin.

Furthermore, with the present invention, in order to prevent the reduction in optical efficiency that arises through temperature changes, it is desirable for the lens system to be formed by inserting at least one glass lens and at least one plastic lens into the lens barrel. The inserted plastic lens has a refractive power with a sign opposite that of the plastic lens that is formed as one body with the lens barrel. The plastic lenses are configured to satisfy the following conditional formula (1):

$$-2.0 < fa/fb < -0.5 \qquad (1)$$

where fa=the focal length of the plastic lens that is formed as one body with the lens barrel; and fb=the focal length of the plastic lens that is inserted into the lens barrel.

Conditional formula (1) relates to the so-called temperature neutralization (the prevention of a reduction of optical efficiency due to changes in temperature).

If the range of conditional formula (1) is deviated from, changes in the focal length and back focus due to changes in temperature become excessive and a proper optical efficiency cannot be obtained.

The triplet lens system of the present invention structurally comprises a positive meniscus lens L1 with a convex surface on the object side, a biconcave lens L2 with the concave surface with the stronger curvature on the image side, and a biconvex lens L3 with the convex surface with the stronger curvature on the object side. The first lens L1 is a glass lens, the second lens L2 is made of plastic formed by polycarbonate, polystylene, or a copolymer of polystylene and methacryl, and the third lens L3 is made of plastic formed by a copolymer made of polycarbonate and methacryl.

When the lens holding device of the present invention is applied to this triplet lens system, the lens barrel 4 is formed by extending the outside edge of the lens L3 along the optical axis direction, as shown in FIG. 1. Lens L2 and lens L1 are inserted in order into lens barrel 4. In addition to holding fixing lens L1 in place, the holding ring 5 can be used to shade the end 110 of the lens barrel 4.

Lens L2 is inserted into the lens barrel and is held in place in the optical axis direction through the contact between the right end surface of lens L2 and the inside perpendicular wall surface 105 of the lens barrel 4. Lens L2 is held against movement in the direction perpendicular to the optical axis through the contact of the outer edge surface of the lens L2 with the inner wall surface 104 of the lens barrel 4.

Lens L1 is inserted into the lens barrel 4 in the same manner as lens L2. Lens L1 is fixed in position in the optical axis direction by the contact of the apex 101 of the lens L2 on the object side surface with the image side surface of L1 and is held against movement in the direction perpendicular to the optical axis through the contact of the outside edge surface of the lens L1 with the inner wall surface 103 of the lens barrel 4.

It is desirable for the inner wall surfaces 103 and 104 of the lens barrel 4 to be bevelled surfaces such that the diameter gradually increases toward the object side and for the outside edge surfaces of lens L1 and lens L2 to be bevelled surfaces such that the surfaces contact the inner wall surfaces 103 and 104.

The incoming light rays are restricted by the aperture 102 of the holding ring 5 in the vicinity of the incident surface and are further restricted by the aperture of the thin plate 6 that is enclosed in the lens L3 in the vicinity of the exit surface. In FIG. 1, the dashed line 106 is a hole formed by the guide posts 106' that are provided to precisely enclose the thin plate 6. The dashed line 7 is the diaphragm or shutter of the triplet lens.

The positive lens L1 is the lens positioned nearest the object side and has a meniscus shape with a convex surface on the object side in order to cause the light rays to converge while suppressing the generation of astigmatism as much as possible.

The negative lens L2 is formed as a biconcave lens with the concave surface with the stronger curvature provided on the image side in order to correct spherical aberrations and astigmatisms that are generated by lens L1 and lens L3. Chromatic aberrations on the negative lens L2 can be properly corrected by using a material with higher dispersion. It is desirable that the surface on the object side of the negative lens L2 be an aspherical lens in order to properly correct aberrations.

The positive lens L3 is a biconvex lens with the convex surface with the stronger curvature provided on the object side in order to properly correct coma aberrations. The shape of the third lens L3 depends on its index of refraction. The higher the index of refraction, the weaker the curvature on the object side. Thus, the lens approaches a perfect biconvex shape (the convex surface on the object side and the convex surface on the image side have the same curvature).

By forming the first lens L1 from glass and the second lens L2 and the third lens L3 from plastic, the reduction in optical efficiency due to temperature changes is canceled by the two plastic lenses together.

The second lens L2 is formed from a high dispersion plastic material, such as polycarbonate, polystylene, or a copolymer of polystylene and methacryl, in order to properly correct axial chromatic aberrations. The third lens L3 is formed from a copolymer of polystylene and methacryl in order to provide a well-balanced correction of off-axis chromatic aberrations.

With the present invention, by using a copolymer of polystylene and methacryl, which has less change in shape and a moderate dispersion, the above-mentioned problems with respect to the methacryl resin material of the third lens in the conventional lens system are resolved.

In order to obtain an even better optical efficiency, it is desirable that the triplet lens of the present invention satisfy the follow conditional formulae (2) through (7).

| | |
|---|---|
| $0.58 < f1/f < 0.66$ | (2) |
| $-0.75 < f2/f3 < -0.69$ | (3) |
| $0.029 < d2/f < 0.035$ | (4) |
| $0.029 < d4/f < 0.035$ | (5) |

-continued

| 0.16 < n1−n2 < 0.21 | (6) |
| 6 < v1−v3 < 14 | (7) | where f=the focal length of the lens system as a whole;
f1=the focal length of the positive meniscus lens L1;
f2=the focal length of the biconcave plastic lens L2;
f3=the focal length of the biconvex plastic lens L3;
d2=the distance between lens L1 and lens L2 at the axis;
d4=the distance between lens L2 and lens L3 at the axis;
n1=the index of refraction for the d-line (λ(lambda)= 587.6 nm) of lens L1;
n2=the index of refraction for the d-line (λ(lambda)= 587.6 nm) of lens L2;
v1=the Abbe number of lens L1; and
v3=the Abbe number of lens L3.

Conditional formula (2) establishes the focal length of the first lens L1. If the upper limit of conditional formula (2) is exceeded, correction of the image surface curvature becomes very difficult. If the lower limit of conditional formula (2) not satisfied, a reduction of optical efficiency due to changes in temperature cannot be avoided.

Conditional formula (3) establishes the ratio of the focal lengths of the plastic lenses (lens L2 and lens L3). If the upper limit of conditional formula (3) is exceeded, the refractive power of the second lens L2 becomes too large and the efficiency is reduced by changes in temperature. If the lower limit of conditional formula (3) is not satisfied, the refractive power of the second lens L2 is too weak, and the evenness of the image surface cannot be obtained.

Conditional formula (4) establishes the distance between the first lens L1 and the second lens L2 at the axis. If the lower limit of conditional formula (4) is not satisfied, the light amount at the perimeter cannot be maintained because of interference between the first lens L1 and the second lens L2. If the upper limit of conditional formula (4) is exceeded, the spherical aberrations and axial chromatic aberrations are not sufficiently corrected because the contribution of the second lens L2 decreases.

Conditional formula (5) establishes the distance between the second lens L2 and the third lens L3 at the axis. If the lower limit of conditional formula (5) is not satisfied, the negative distortion becomes too great. If the upper limit of conditional formula (5) is exceeded, the lens system may become too large and bulky.

Conditional formula (6) establishes the index of refraction of the first lens L1. If the lower limit of conditional formula (6) is not satisfied, the Petzval sum becomes too large in the positive direction, and the efficiency decreases at the intermediate field angle. If the upper limit of conditional formula (6) is exceeded, the astigmatism at the largest field angle becomes excessive.

Conditional formula (7) relates to the correction of chromatic aberration. As described above, on a conventional triplet lens that uses a methacryl resin for the third lens L3, the off-axis chromatic aberrations are over-corrected in comparison with the axial chromatic aberrations, making it impossible to obtain a proper off-axis efficiency. With the present invention, this problem was resolved as it was discovered that the higher the dispersion of the third lens L3 with respect to the dispersion of the first lens L1, the greater the over-correction of the off-axis chromatic aberration.

Thus, when the lower limit of conditional formula (7) is not satisfied, the off-axis chromatic aberration is over-corrected. Conversely, when the upper limit of conditional formula is exceeded, the off-axis chromatic aberration is not sufficiently corrected.

The structure of a triplet lens that pertains to the first embodiment of the present invention will be described with continued reference to FIG. 1. The triplet lens shown comprises, in order from the object side, a positive meniscus lens L1 with a convex surface on the object side, a biconcave lens L2 with an aspherical surface on the object side, and a biconvex lens L3 with the stronger curvature on the object side.

The first lens L1 is made from lanthanum-type glass, which has a high index of refraction and a low dispersion. The second lens L2 is made from polycarbonate, and the third lens L3 is made from a copolymer of polystylene and methacryl. The index of refraction and the dispersion of the copolymer of polystylene and methacryl can be changed by varying the composition ratio, but with the present embodiment, a comparatively high percentage of methacryl is used.

The values of the items of the first embodiment of the present invention are given in the following table (1). In table (1), f indicates the focal length, FN indicates the F-number, and Bf indicates the back focus. The number at the left indicates the order of each lens surface from the object side, r indicates the radius of curvature of each lens surface, d indicates the distance between each lens surface, and n and v indicate the index of refraction and the Abbe number, respectively, for the d-line (λ(lambda)=587.6 nm).

The aspherical surface is expressed by the following formula (8), taking the height from the optical axis in the vertical direction as y, the amount of position change in the optical axis direction at height y as S(y), the standard radius of curvature as R, the conical coefficient as k, and the aspherical surface coefficient at n as Cn.

$$S(y)=(y^2/R)/[1+(1-k*y^2/R^2)^{1/2}]+C_2*y^2+C_4*y^4+C_6*y^6+C_8*y^8+C_{10}*y^{10}+ \quad (8)$$

The radius of curvature r of the aspherical surface in the vicinity of the axis is defined by the following formula (9).

$$r=1/(2*C_2+1/R) \quad (9)$$

The aspherical surface of the embodiment is indicated by a * at the right of the surface number.

TABLE 1 f = 32.002
FN = 4.5
Bf = 26.036

| | r | d | n | v | |
|---|---|---|---|---|---|
| 1 | 9.254 | 3.000 | 1.78797 | 47.47 | (L1) |
| 2 | 18.356 | 1.000 | | | |
| 3* | −25.662 | 1.000 | 1.58300 | 29.90 | (L2) |
| 4 | 7.857 | 1.000 | | | |
| 5 | 13.542 | 2.000 | 1.53570 | 40.58 | (L3) |
| 6 | −15.850 | 1.000 | | | |
| 7 | ∞ | 25.036 | (aperture stop) | | |

(aspherical surface data)

| | k | $C_2$ | $C_4$ | $C_6$ |
|---|---|---|---|---|
| Surface 3 | −4.0040 | 0.000 | $3.91000 \times 10^{-5}$ | $1.68800 \times 10^{-9}$ |
| | $C_8$ | | $C_{10}$ | R |
| | $-5.29600 \times 10^{-8}$ | | $1.03700 \times 10^{-9}$ | −25.662 |

(values relating to conditions)
(1) fa/fb = −1.368
(2) f1/f = 0.646
(3) f2/f3 = −0.731
(4) d2/f = 0.0312
(5) d4/f = 0.0312
(6) n1−n2 = 0.205
(7) v1−v3 = 6.89

FIG. 4 shows the various aberration diagrams of embodiment 1. In each aberration diagram, FN indicates the F-number, Y indicates the image height, H indicates the height of the incident light rays, A indicates the angle of incidence of the primary light rays, d indicates the d-line ($\lambda$(lambda)=587.6 nm), and g indicates the g-line ($\lambda$(lambda)=435.8 nm).

In the aberration diagram showing the astigmatism, the solid line shows the sagittal image plane and the dashed line shows the meridional image plane.

As can be clearly seen from each aberration diagram, with the present embodiment, the various aberrations are properly corrected over a wide field angle that reaches a field angle of 69°.

Figure 2:
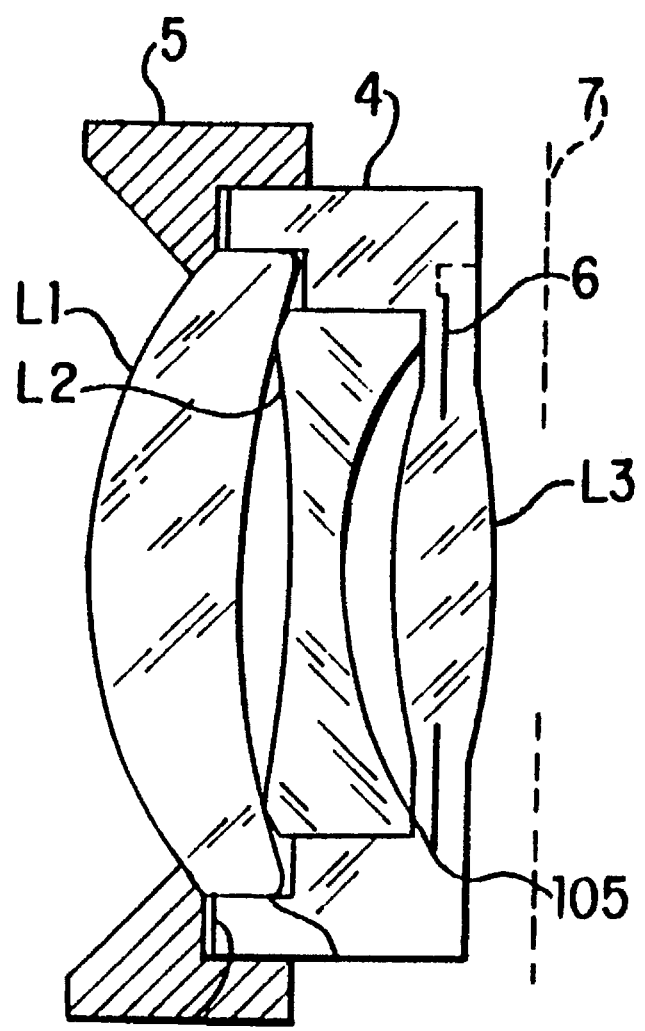
FIG. 2 shows the structure of a triplet lens that pertains to the second embodiment of the present invention.

FIG. 2 is a drawing that shows the structure of a triplet lens that pertains to a second embodiment of the present invention. The triplet lens shown comprises, in order from the object side, a positive meniscus lens L1 with a convex surface on the object side, a biconcave lens L2 with an aspherical surface on the object side, and a biconvex lens L3.

The first lens L1 is made from lanthanum-type glass, which has a high index of refraction and a low dispersion. The second lens L2 is made from a copolymer of polystylene and methacryl, and the third lens L3 is also made from a copolymer of polystylene and methacryl. The index of refraction and the dispersion of the copolymer of polystylene and methacryl can be changed by varying the composition ratio. With the present embodiment, a comparatively high percentage of polystylene is used for the second lens L2, providing a higher dispersion, and a comparatively high percentage of methacryl is used for the third lens L3, providing a moderate dispersion. The chromatic aberrations are thereby corrected. It is also possible to use pure polystylene for the second lens L2 with the present invention.

The values of the items of the second embodiment of the present invention are given in the following table (2). In table (2), f indicates the focal length, FN indicates the F-number, and Bf indicates the back focus. The number at the left indicates the order of each lens surface from the object side, r indicates the radius of curvature of each lens surface, d indicates the distance between each lens surface, and n and v indicate the index of refraction and the Abbe number, respectively, for the d-line ($\lambda$(lambda)=587.6 nm).

TABLE 2 f = 32.000
FN = 4.6
Bf = 26.449

|   | r | d | n | v |   |
|---|---|---|---|---|---|
| 1 | 8.577 | 2.500 | 1.74810 | 52.28 | (L1) |
| 2 | 18.687 | 1.000 |   |   |   |
| 3* | −23.905 | 1.000 | 1.57110 | 33.59 | (L2) |
| 4 | 7.226 | 0.950 |   |   |   |
| 5 | 12.687 | 1.900 | 1.53570 | 40.58 | (L3) |
| 6 | −16.382 | 1.000 |   |   |   |
| 7 | ∞ | 25.449 | (aperture stop) |   |   |

(aspherical surface data)

| | k | $C_2$ | $C_4$ | $C_6$ |
|---|---|---|---|---|
| Surface 3 | −7.5730 | 0.000 | $5.26900 \times 10^{-5}$ | $4.16900 \times 10^{-7}$ |
| | $C_8$ | | $C_{10}$ | R |
| | $-1.04500 \times 10^{-7}$ | | $2.20000 \times 10^{-9}$ | −23.905 |

(values relating to conditions)
(1) fa/fb = −1.422
(2) f1/f = 0.599
(3) f2/f3 = −0.703
(4) d2/f = 0.0312
(5) d4/f = 0.0297
(6) n1−n2 = 0.177
(7) v1−v3 = 11.7

FIG. 5 shows the various aberration diagrams of the second embodiment. In each aberration diagram, FN indicates the F-number, Y indicates the image height, H indicates the height of the incident light rays, A indicates the angle of incidence of the primary light rays, d indicates the d-line ($\lambda$(lambda)=587.6 nm), and g indicates the g-line ($\lambda$(lambda)=435.8 nm).

On the aberration diagram showing the astigmatism, the solid line shows the sagittal image plane and the dashed line shows the meridional image plane.

As can be clearly seen from each aberration diagram, with the present embodiment, the various aberrations are properly corrected over a wide field angle that reaches a field angle of 69°.

The lens holding device of the present invention is not limited to the embodiments described above. It is possible to apply the lens holding device to a portion of an optical system, such as to hold a movable unit of a zoom lens.

As described above, according to the present invention, a lens holding device can be obtained that has fewer components and is structurally simpler and lower in cost than a conventional device. Furthermore, by applying the lens holding device of the present invention to a triplet lens, for example, a lens system can be obtained that is low in cost and easy to assemble, yet has a high efficiency.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the scope of the invention as defined in the following claims.

What is claimed is:

1. A lens holding device comprising:
    a cylindrical lens barrel structured as one body with a single plastic lens, said cylindrical lens barrel having an inside diameter larger than an effective diameter of the single plastic lens; and
    a holding ring made from an impermeable substance, said holding ring holding at least one lens inserted into the cylindrical lens barrel and fixing a position of the at least one lens, wherein the holding ring comprises,
        a cylindrical portion that surrounds the outside surface of the lens barrel,
        a covering component that covers an edge surface of the lens barrel, and
        a contacting component that contacts and holds an outermost lens of the at least one lens inserted into the lens barrel.

2. A lens holding device according to claim 1, wherein said holding ring further comprises an aperture that restricts light rays.

3. A lens holding device according to claim 2, further comprising a fixed diaphragm in the form of a thin plate that has an aperture and is enclosed in the single plastic lens, said thin plate being formed as one body with the lens barrel and being fixed in a position virtually perpendicular to the optical axis.

4. A lens holding device according to claim 3, wherein said fixed diaphragm is constructed of a member selected from the group consisting of steel, aluminum, brass, copper, and nickel.

5. A lens holding device according to claim 3, wherein a glass transition temperature of the plate is higher than the glass transition temperature of the single lens and the lens barrel.

6. A lens holding device according to claim 2, wherein an inner wall of the lens barrel is formed as a slanted surface such that an inside diameter of said barrel gradually increases along an optical axis moving away from the single plastic lens.

7. A lens holding device according to claim 2, wherein the single plastic lens and the lens barrel are formed of a member selected from the group consisting of polycarbonate, polystylene, a copolymer of polystylene and methacryl, and polyolefin resin.

8. A lens holding device comprising:

cylindrical lens barrel means, structured as one body with a single plastic lens, for holding securely said single plastic lens in position along an optical axis, said cylindrical lens barrel means having an inside diameter larger than an effective diameter of the single plastic lens; and holding means, made from an impermeable substance, for holding at least one lens inserted into the cylindrical lens barrel means and fixing a position of the at least one lens, wherein the holding means comprises, means for surrounding the outside surface of the lens barrel means, covering means for covering an edge surface of the lens barrel means, and contacting means for contacting and holding an outermost lens of the at least one lens inserted into the lens barrel means.

9. A lens holding device according to claim 8, wherein said holding means further comprises aperture means for restricting light rays.

10. A lens holding device according to claim 8, further comprising second means for restricting light rays, said second means including a thin plate that has an aperture and is enclosed in the single plastic lens, said thin plate being formed as one body with the barrel means and being fixed in a position virtually perpendicular to the optical axis.

11. A lens holding device according to claim 10, wherein the glass transition temperature of the thin plate is higher than the glass transition temperature of the single lens and the lens barrel means.

12. A lens holding device according to claim 10, wherein said thin plate is constructed of a member selected from the group consisting of steel, aluminum, brass, copper and nickel.

13. A lens holding device according to claim 8, wherein an inner wall of the lens barrel means is formed as a slanted surface such that an inside diameter of said mirror lens tube gradually increases along an optical axis moving away from the single plastic lens.

14. A lens holding device according to claim 8, wherein the single plastic lens and the lens barrel means are formed of a member selected from the group consisting of polycarbonate, polystylene, a copolymer of polystylene and methacryl and polyolefin resin.

15. A method of making a holding device for a lens system, the method comprising the steps of:

selecting materials for constructing a single plastic lens, a lens barrel, and a circular disk having a central aperture;

providing a set of metal molds for forming said single plastic lens and said lens barrel as an integral component, one of said molds being an exit mold for forming an exit side of said single plastic lens;

inserting said circular disk having a central aperture in notches provided in guide posts of said exit mold;

assembling said set of metal molds; and pouring a resin in a space created within the set of metal molds.

16. A method according to claim 15, wherein said selecting step includes selecting materials so that the glass transition temperature of the disk is higher than the glass transition temperature of the single plastic lens and the lens barrel.

17. A method according to claim 15, wherein said selecting step includes selecting a material for the single plastic lens and the lens barrel that is a member selected from the group consisting of polycarbonate, polystylene, a copolymer of polystylene and methacryl, and polyolefin resin.

18. A method according to claim 15, wherein said selecting step comprises selecting a material for the disk that is a member selected from the group consisting of steel, aluminum, brass, copper, and nickel.

19. A lens system in combination with a lens holding device comprising:

a cylindrical lens barrel structured as one body with a single plastic lens, said cylindrical lens barrel having an inside diameter larger than an effective diameter of the single plastic lens;

a holding ring, made from an impermeable substance, said holding ring holding at least one lens inserted into the cylindrical lens barrel and fixing a position of the at least one lens, said cylindrical lens barrel, said single plastic lens and said holding ring forming said holding device; and at least one glass lens that is inserted into the cylindrical lens barrel and at least one plastic lens that has a refractive power with a sign opposite that of said single plastic lens wherein when a focal length of said single plastic lens is taken as fa and a focal length of said at least one plastic lens that is inserted into the lens barrel is taken as fb, such that the following condition is satisfied:

$-2.0 < fa/fb < -0.5.$

20. A lens system and lens holding device according to claim 19, wherein an inner wall of the lens barrel is formed as a slanted surface such that an inside diameter gradually increases along the optical axis away from the single plastic lens and an outside edge of the lens inserted into the lens barrel is bevelled so as to contact the inner wall surface of the lens barrel.

21. A lens system and lens holding device according to claim 19, wherein the single plastic lens that is formed as one body with the lens barrel is formed from a member selected from the group consisting of polycarbonate, polystylene, a copolymer of polystylene and methacryl and a polyolefin resin, and is formed by injection molding.

22. A triplet lens system in combination with a lens holding device, said lens holding device comprising:

a cylindrical lens barrel structured as one body with a single plastic lens, said cylindrical lens barrel having an inside diameter larger than an effective diameter of the single plastic lens; and a holding ring, made from an impermeable substance, said holding ring holding at least one lens inserted into the cylindrical lens barrel and fixing the position of the at least one lens;

said lens system comprising:

a glass lens disposed adjacent an object side and inserted into the cylindrical lens barrel, the glass lens being a positive meniscus lens with a convex surface on the object side;

a first plastic lens adjacent said glass lens, the first plastic lens being a biconcave lens having a concave surface with stronger curvature on the image side, said first plastic lens being formed from polycarbonate, polystylene, or a copolymer of polystylene and methacryl; and a second plastic lens, formed as one body with the cylindrical lens barrel and having a refractive power with a sign opposite that of the first plastic lens, said first plastic lens being fixed in position between the glass lens and the second plastic lens, the second plastic lens being a biconvex lens such that a convex surface having a stronger curvature of said second plastic lens is on the object side, said second plastic lens being formed from a copolymer of polystylene and methacryl.

23. A triplet lens system and holding device according to claim 22, wherein an inner wall of the lens barrel is formed as a slanted surface such that an inside diameter of said lens barrel gradually increases along the optical axis away from the second plastic lens, and wherein outside edges of the glass lens and the first plastic lens are bevelled so as to contact the inner wall surface of the lens barrel.

24. A holding device and triplet lens system according to claim 22, wherein an object side surface of the first plastic lens is formed as an aspherical surface wherein the following conditions are satisfied:

$0.58 < f1/f < 0.66$ $-0.75 < f2/f3 < -0.69$ $0.029 < d2/f < 0.035$ $0.029 < d4/f < 0.035$ $0.16 < n1 - n2 < 0.21$ $6 < v1 - v3 < 14$ where a focal length of the entire system is f, a focal length of the glass lens L1 is f1, a focal length of the plastic concave lens L2 is f2, a focal length of the plastic convex lens L3 is f3, a space between the glass lens L1 and the plastic concave lens L2 at the axis is d2, a distance between the plastic concave lens L2 and the plastic convex lens L3 at the axis is d4, an index of refraction for the d-line of the glass lens L1 is n1, an index of refraction for the d-line of the plastic concave lens L2 is n2, an Abbe number of the glass lens L1 is v1, and an Abbe number of the plastic convex lens L3 is v3.

25. A lens holding device comprising:

a cylindrical lens barrel structured as one body with a single plastic lens, said cylindrical lens barrel having multiple inner diameters, wherein each inner diameter is larger than an effective diameter of the single plastic lens; and a holding ring made from an impermeable substance, said holding ring holding at least one lens inserted into the cylindrical lens barrel and fixing a position of the at least one lens, wherein the holding ring comprises, a cylindrical portion that surrounds the outside surface of the lens barrel, a covering component that covers an edge surface of the lens barrel, and a contacting component that contacts and holds an outermost lens of the at least one lens inserted into the lens barrel.

* * * * *